(12) United States Patent
Klose

(10) Patent No.: US 9,237,320 B2
(45) Date of Patent: Jan. 12, 2016

(54) METHOD AND DEVICE FOR GENERATING A CALIBRATED PROJECTION

(75) Inventor: Stefan Klose, Schulzendorf (DE)

(73) Assignee: FRAUNHOFER-GESELLSCHAFT ZUR FOERDERUNG DER ANGEWANDTEN FORSCHUNG E.V., Munich (DE)

( * ) Notice: Subject to any disclaimer, the term of this patent is extended or adjusted under 35 U.S.C. 154(b) by 898 days.

(21) Appl. No.: 13/503,408

(22) PCT Filed: Oct. 26, 2010

(86) PCT No.: PCT/EP2010/066155
§ 371 (c)(1),
(2), (4) Date: Apr. 23, 2012

(87) PCT Pub. No.: WO2011/051281
PCT Pub. Date: May 5, 2011

(65) Prior Publication Data
US 2012/0212627 A1    Aug. 23, 2012

(30) Foreign Application Priority Data

Oct. 28, 2009 (DE) .......................... 10 2009 046 114

(51) Int. Cl.
*G03B 21/14* (2006.01)
*H04N 9/31* (2006.01)

(52) U.S. Cl.
CPC ........... *H04N 9/3197* (2013.01); *H04N 9/3182* (2013.01); *H04N 9/3185* (2013.01); *H04N 9/3194* (2013.01)

(58) Field of Classification Search
CPC . H04N 9/3194; H04N 9/3185; H04N 9/3197; G03B 21/14
USPC .......... 353/30, 46, 69, 70, 121; 348/275, 383, 348/743–748; 349/5, 7–9
See application file for complete search history.

(56) References Cited

U.S. PATENT DOCUMENTS

| 6,222,593 B1 | 4/2001 | Higurashi et al. |
| 6,433,840 B1 | 8/2002 | Poppleton |

(Continued)

FOREIGN PATENT DOCUMENTS

| DE | 102 51 217 B3 | 6/2004 |
| DE | 10 2005 037 797 A1 | 2/2007 |

(Continued)

OTHER PUBLICATIONS

Sajadi et al.: "Markerless View-Independent Registration of Multiple Distorted Projectors on Extruded Surfaces Using Uncalibrated Camera" IEEE Transactions on Visualization and Computer Graphics, 2009: 15(6):1307-1316.

(Continued)

*Primary Examiner* — Sultan Chowdhury
(74) *Attorney, Agent, or Firm* — Maschoff Brennan

(57) ABSTRACT

The invention relates to a method and an apparatus for generating a calibrated projection, wherein the method for example includes providing a projection surface (1) for the projection of at least one image (2), wherein the projection surface (1) includes a calibrating structure (5) following its spatial extension, which has a first side (51) and a second side (52), which extends parallel to the first side (51), and a constant height as measured in direction of the first or the second side (51, 52), generating an image (5') of the calibrating structure (5) in an image plane by means of a camera (4), reconstructing the spatial extension of the projection surface (1) in the region of the calibrating structure (5), and generating a projection calibrated with respect to the calibrating structure by using the spatial extension of the projection surface reconstructed according to the providing projection surface step.

17 Claims, 12 Drawing Sheets

(56) References Cited

U.S. PATENT DOCUMENTS

| | | | |
|---|---|---|---|
| 2002/0021418 A1* | 2/2002 | Raskar | 353/69 |
| 2004/0184011 A1 | 9/2004 | Raskar et al. | |
| 2004/0201825 A1* | 10/2004 | Kobayashi et al. | 353/70 |
| 2005/0041217 A1* | 2/2005 | Tajima | 353/69 |
| 2005/0083402 A1 | 4/2005 | Klose | |
| 2009/0067749 A1 | 3/2009 | Schiewe et al. | |
| 2009/0213335 A1* | 8/2009 | Kondo | G03B 21/14 353/30 |

FOREIGN PATENT DOCUMENTS

| | | | |
|---|---|---|---|
| DE | 10 2006 002 602 A1 | 7/2007 | |
| EP | 1 434 434 A1 | 6/2004 | |
| WO | 2007/149323 A2 | 12/2007 | |

OTHER PUBLICATIONS

Courteille et al, "Shape from Contour for the Digitization of Curved Documents", Proceedings of the 8th Asian conference on Computer vision-Volume Part II, Nov. 18, 2007, pp. 10.

Taddei et al, "Template-based paper reconstruction from a single image is well posed when the rulings are parallel", IEEE Computer Society Conference on Computer Vision and Pattern Recognition Workshops, 2008, Jun. 23, 2008, pp. 6.

Sajadi et al.: "Auto-Calibration of Cylindrical Multi-Projector Systems" IEEE Virtual Reality, 2010.

* cited by examiner

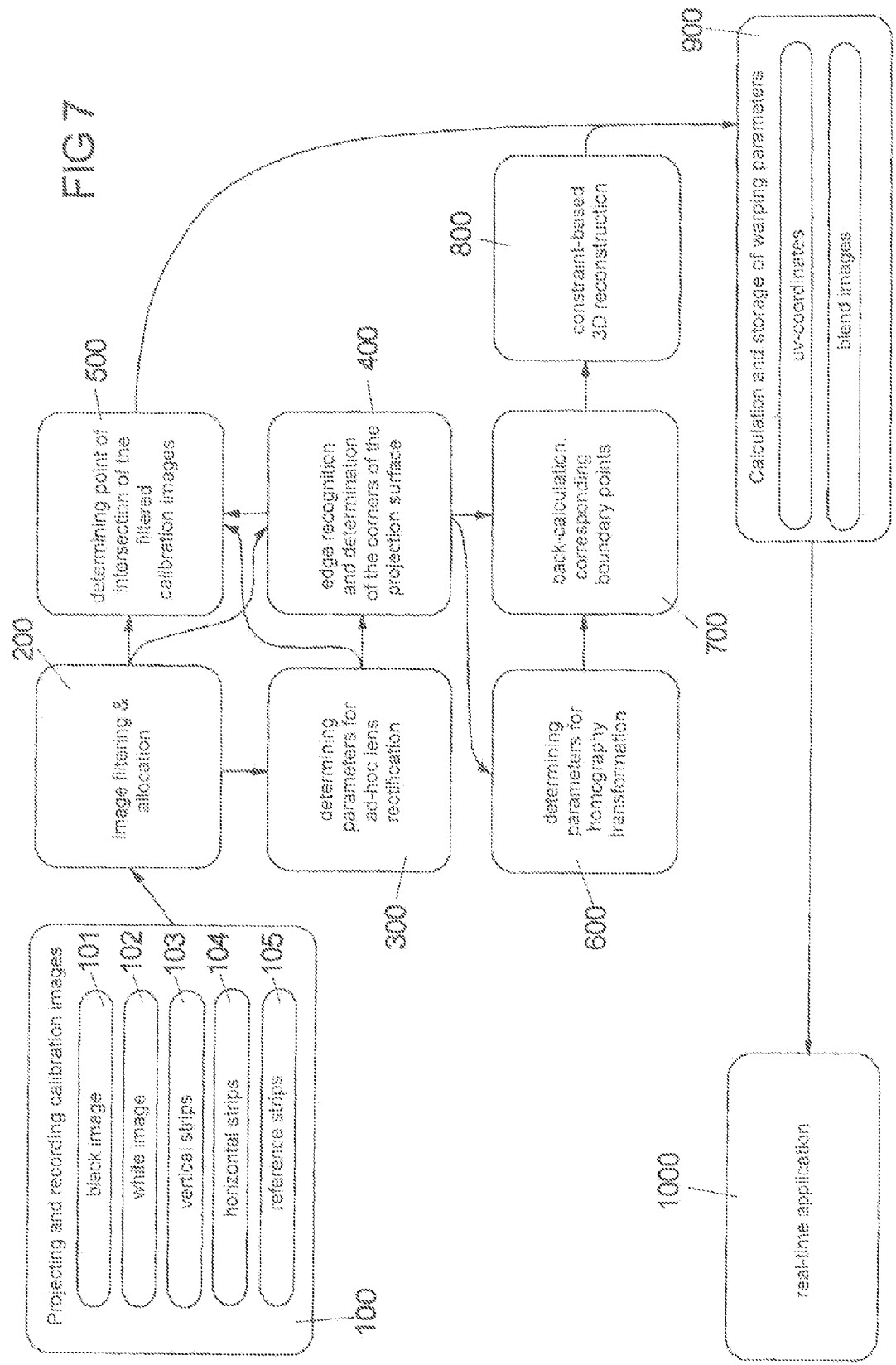

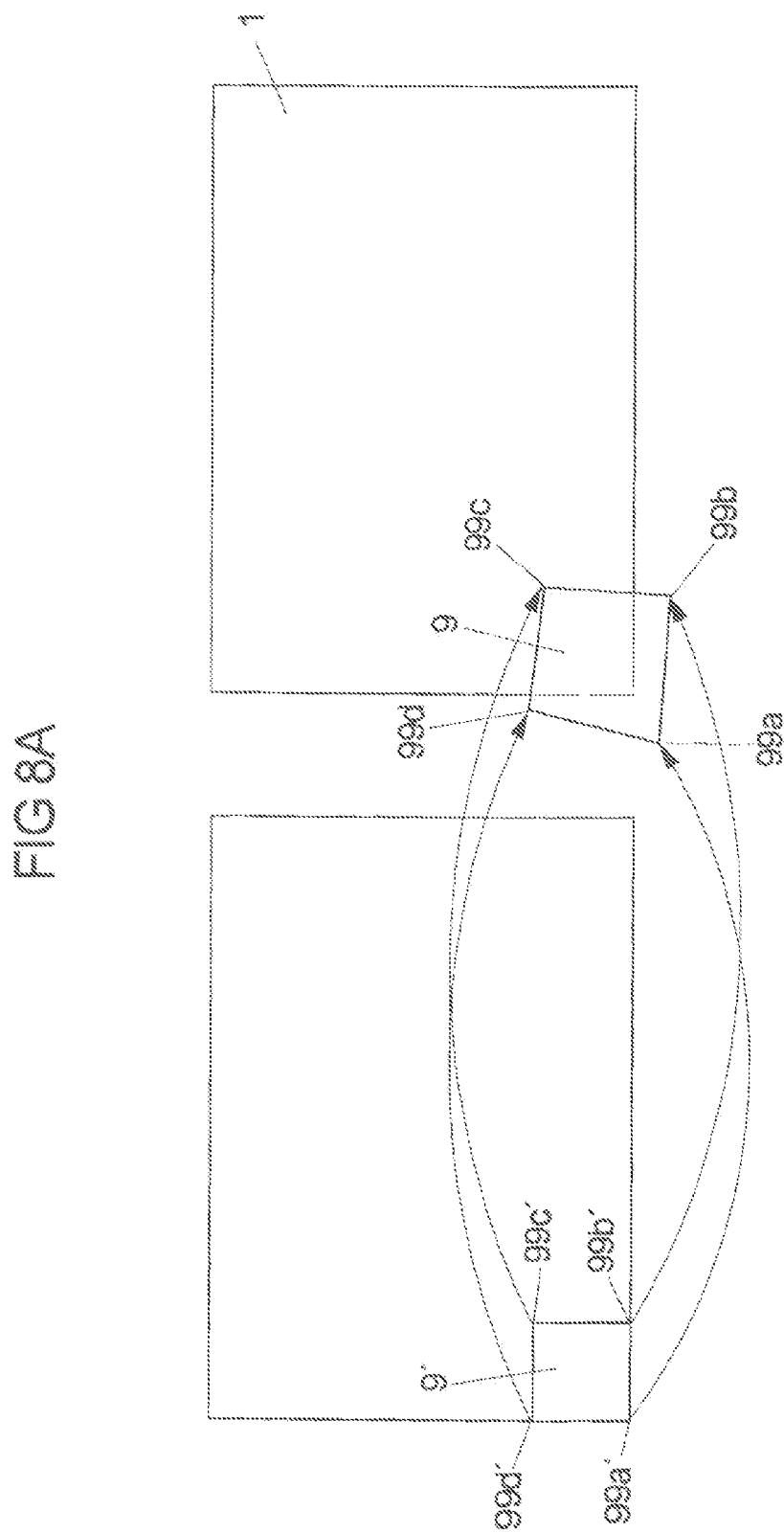

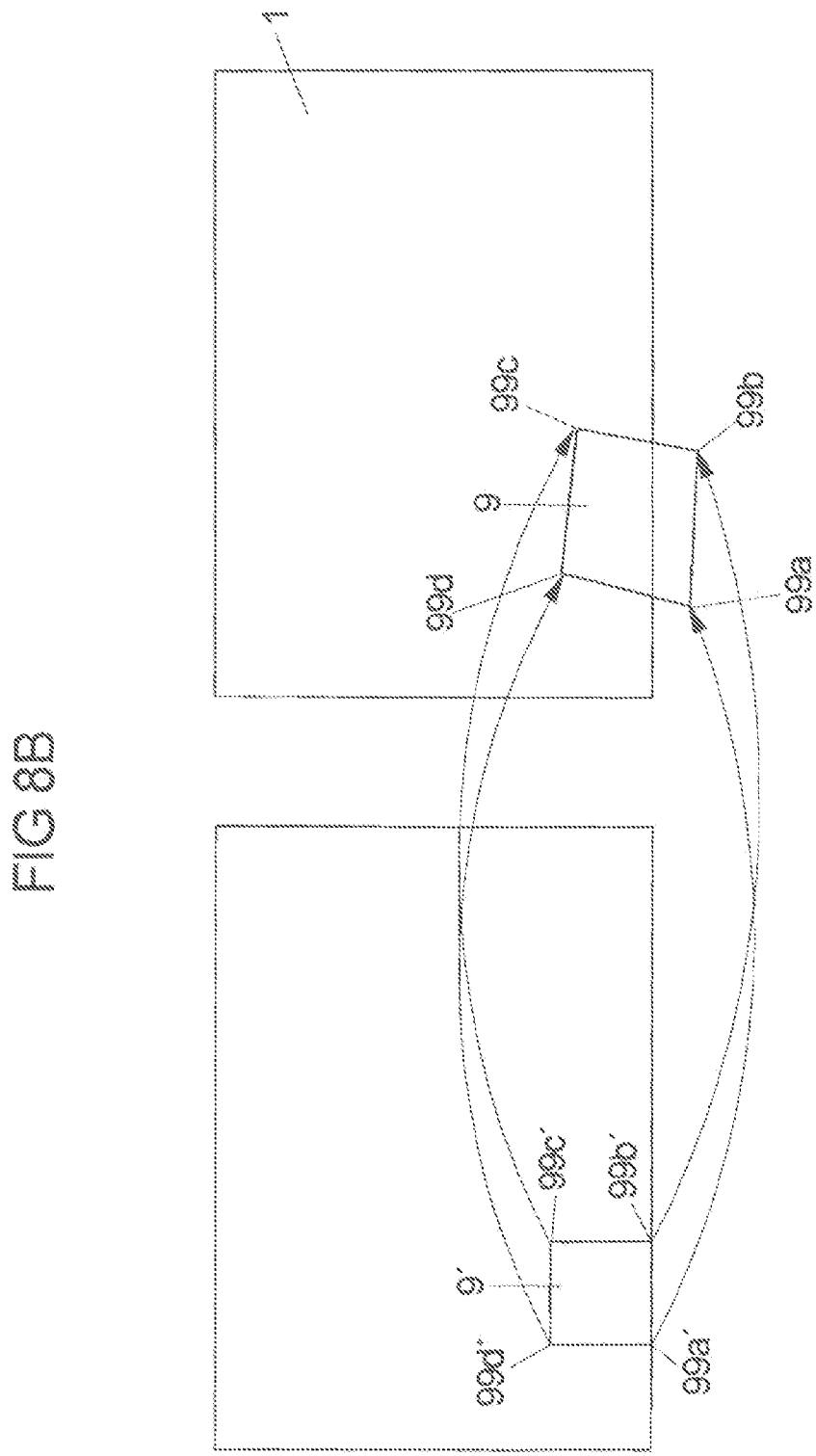

METHOD AND DEVICE FOR GENERATING A CALIBRATED PROJECTION

CROSS-REFERENCE TO A RELATED APPLICATION

This application is a National Phase Patent Application of International Patent Application Number PCT/EP2010/066155, filed on Oct. 26, 2010, which claims priority of German Patent Application Number 10 2009 046 114.0, filed on Oct. 28, 2009.

BACKGROUND

This invention relates to methods for generating a calibrated projection and to apparatuses for generating a calibrated projection.

The use of projection systems for projecting an image onto a projection surface is common practice in many fields of industry, research and teaching. The projection of the image typically is effected onto a planar projection surface, e.g. a screen or an outer or inner wall of a building. From the prior art it is also known to use a plurality of projectors, with each of which partial images of a total image are projected. Such multi-projector system is described for example in DE 102 51 217 B3.

Multi-projector systems also are used for redundancy reasons, for increasing the luminous intensity or for increasing the resolution. For example, applications of such projector systems can be found in the field of architecture and/or generally in the field of CAD, in order to be able to in particular also represent details and/or also large models. The projectors of a multi-projector system must, however, be aligned ("calibrated") relative to each other and/or relative to the projection surface such that a rather distortion-free image which appears correct to a viewer is generated. In particular, the projected partial images of the various projectors are adapted to each other and/or to the projection surface in a pixel-accurate manner ("stitching" or "warping"). Furthermore, the brightness of the partial images can be reduced in an overlap region with an adjacent partial image, in order to avoid that the total image has a greater brightness in such overlap regions.

SUMMARY

The problem underlying the invention consists in providing methods and apparatuses which provide a preferably distortion-free projection also onto a projection surface which does not extend in a planar manner along a single plane.

According to an exemplary embodiment of the invention, there is provided a method for generating a calibrated projection on a projection surface, which includes the following steps:
a) arranging and/or generating a calibrating structure following the spatial extension of the projection surface, which has a first side and a second side, which extends parallel to the first side, and has a constant height as measured in direction of the first or the second side;
b) generating an image of the calibrating structure in an image plane by means of a camera;
c) reconstructing the spatial extension of the projection surface in the region of the calibrating structure, comprising the following steps:
d) determining a plurality of pairs of points of the image of the calibrating structure, which each include a first and a second point of the image of the calibrating structure, wherein the first and the second point each correspond to a first and a second point of the actual calibrating structure, which are located opposite to each other along the first or the second side of the calibrating structure;
e) generating a plurality of auxiliary beam pairs which each include two auxiliary beams, which extend from the first and the second point of the pairs of points to an imaginary vanishing point before the image plane;
f) generating a plurality of supporting paths parallel to each other, which each begin on one of the auxiliary beams of one of the auxiliary beam pairs and end on the respective other auxiliary beam of one of the auxiliary beam pairs;
g) changing the length and/or the orientation of the supporting paths, until all supporting paths have the same length and each impinge on a common plane under the same angle;
h) generating a (virtual) model of the projection surface by using the supporting paths found according to step g), wherein these supporting paths are path sections of the sought projection surface, which extend parallel to the first and second side of the calibrating structure;
i) generating a projection calibrated in particular with respect to the calibrating structure by using the model generated according to step h), i.e. the reconstructed spatial extension of the projection surface.

This method allows for a projection calibrated with respect to the portion of the projection surface extending in the region of the calibrating structure, i.e. an in particular distortion-free projection, even if this portion of the projection surface does not extend along a single plane in a continuously planar manner, but which e.g. has a curvature (or several curvatures) and/or a kink (or several kinks).

To be able to generate such calibrated projection, the spatial extension of the projection surface is determined by using the calibrating structure, wherein the method assumes that the projection surface in the region of the calibrating structure is designed in a certain way, namely such that it can be approached by a surface which is generated by shifting a connecting line, which extends between an end of the first side and an end of the second side of the calibrating structure, along the first and the second side of the calibrating structure. The "connecting line" is a three-dimensional curve in principle of any shape, i.e. it need not necessarily extend linearly, but can have e.g. a curvature (or several curvatures) and/or a kink (or several kinks). The method in particular also comprises the provision of a correspondingly designed projection surface.

In particular, the connecting line connects two ends of the first and the second side of the calibrating structure, which are located opposite to each other in a direction vertical to the first or the second side of the calibrating structure, i.e. the two "lower" or the two "upper" ends of the first and the second side. The connecting line then is shifted along the first and the second side, i.e. upwards or downwards, wherein on shifting the connecting line sweeps over a surface along which the projection surface extends. In other words, the projection surface is generated in the region of the calibrating structure by a (e.g. vertical) sweep in a direction along the first and the second side of the calibrating structure. In other words, this property of the projection surface in particular means that it is kinked and/or curved in the region of the calibrating structure along a line which extends parallel to the first and to the second side of the calibrating structure, but substantially has no bulges or depressions or only bulges or depressions which are small as compared to the remaining surface defined by the calibrating structure. It is, however, possible that in case the projection surface has such small depressions or bulges, distortions caused by the same can be corrected by the projection of a calibration pattern. The correction of distortions will be discussed below.

The projection surface including the calibrating structure is photographed by means of a recording means (camera), in particular a digital camera, video camera or high-speed camera, i.e. an image of the calibrating structure is generated in an image plane of the camera. Proceeding from this image of the calibrating structure, the reconstruction of the spatial extension of the projection surface in the region of the calibrating structure then is effected, utilizing the prerequisite that the projection surface in the region of the calibrating structure is generated by a sweep of a connecting line along the first or second side of the calibrating structure.

The reconstruction method comprises the determination of pairs of points of the image of the calibrating structure, whose points each correspond to points of the actual calibrating structure, i.e. the one present on the projection surface. For example, the actual calibrating structure has four corners (i.e. it is a "spatial quadrangle"), wherein two corner points each of the quadrangular calibrating structure are located opposite each other along their first side and along their second side, respectively. These corner points can be identified in the image of the calibrating structure, even if this image is distorted and/or twisted relative to the projection surface in dependence e.g. on the orientation of the camera.

Starting e.g. from corner points of the quandrangle (i.e. the actual calibrating structure), e.g. further pairs of points in the image of the calibrating structure can then be associated to pairs of points of the actual calibrating structure by identifying e.g. pairs of points in the image, whose points each lie on a first connecting line (i.e. a third side of the calibrating structure) between a corner point of the first side and a corner point of the second side and on a second connecting line (a fourth side of the calibrating structure) between the second corner point of the first side and the second corner point of the second side and which each have an identical distance to the first and to the second side of the calibrating structure. A method of identifying such further pairs of points in the image of the calibrating structure will be described below. It should be noted that the calibrating structure need not necessarily have four corners. Other geometries of the calibrating structure are also conceivable, e.g. a structure which—projected into a plane in which the first and the second side of the calibrating structure extend—has more than four corners.

To each point of the determined pairs of points a (virtual) auxiliary beam then is generated (in particular by using a computer program), which each extends from the first and the second point of the pairs of points to a common vanishing point before the image plane of the camera (or generally before a plane in which the image of the calibrating structure extends), i.e. a modeling of depicting the calibrating structure by means of the camera is effected, so to speak, by using a pinhole camera model.

For reconstructing the projection surface, the projection surface is viewed, as described above, as being generated by a sweep along the first and the second side of the calibrating structure, so that in this region the projection surface can be composed by an arrangement of a multitude of (straight) paths arranged in the space parallel to each other with a length which corresponds to the height of the calibrating structure. Correspondingly, a plurality of supporting paths parallel to each other are generated (in particular by a computer program), which each begin on one of the auxiliary beams of one of the auxiliary beam pairs and end on the respective other auxiliary beam of one of the auxiliary beam pairs.

These supporting paths then are varied in terms of their length and/or their orientation (in particular by using a computer-assisted optimizing algorithm), until all supporting paths have the same length and impinge on a common plane under the same angle, i.e. each end on this plane. The supporting paths thus found then form path sections of the sought reconstruction of the projection surface in the region of the calibrating structure, which each extend parallel to the first and the second side of the calibrating structure, and whose ends each correspond to points of a first connecting line between the first and the second side of the calibrating structure (i.e. a third side of the calibrating structure) and points of a second connecting line between the first and the second side of the calibrating structure (i.e. a fourth side of the calibrating structure).

By using the projection surface thus reconstructed, a projection image calibrated with respect to the calibrating structure then is generated, wherein this calibrated projection image can of course also be generated by using a plurality of projectors, i.e. by generating a plurality of composed individual projections. An image calibrated "with respect to the calibrating structure" is distortion-free in particular in the region of the calibrating structure along the projection surface, i.e. it is substantially rectified e.g. in a direction along the first and the second side of the calibrating structure and in a direction vertical thereto, and a plurality of partial images of the projection are joined to each other rather free from interference, if a plurality of projectors are used. The projected image thus appears like a wallpaper, so to speak, which is unrolled onto the projection surface. Possibilities for producing the calibrated projection, in particular for rectifying the projection image, will be discussed below.

In accordance with an exemplary development of the invention a correction of a lens aberration of a camera, with which the image of the calibrating structure is generated, is effected before the reconstruction of the projection surface according to steps e) to i), or the extension of the projection surface reconstructed according to step i) is corrected by taking account of a lens aberration of the camera. For this purpose, e.g. lens rectification methods can be used, which employ calibration bodies or calibration surfaces, or also lens rectification methods which themselves determine rectification parameters from the image contents.

Another possibility of an (ad-hoc) lens rectification consists in utilizing the known extension of the first and the second side of the calibrating structure, wherein the first and the second side in particular extend linearly. From the deviation of the extension of the first and the second side of the calibrating structure depicted by means of the camera from the extension of the (e.g. linearly formed) first and second side of the actual calibrating structure lens rectification parameters can be determined. Furthermore, e.g. an additional calibration pattern also can be projected onto the projection surface in the region of the calibrating structure, which in particular includes (straight) calibration strips which touch or cross the first and the second side of the calibrating structure e.g. vertically (e.g. horizontally and/or vertically) or under an arbitrary angle. The points of intersection obtained by such touching or crossing are recognized in the camera image and connected with each other. These connecting lines between the points of intersection again would have to form a straight line, since straight lines also are depicted as straight lines in an angle shot. If this is not the case (due to the lens distortion), parameters can be determined, in order to correct the effect of the lens distortion. Instead of linear strips, other calibration patterns can of course also be used, whose extension in the projector space, i.e. in the object plane of the projection, is known.

In particular, the lens distortion parameters are determined with an optimization method which comprises an adaptation of correction parameters, until a (simulated) image of the first and the second side of the calibrating structure and/or of the projected calibration strips provides an image whose extension corresponds to the extension of the first and the second side of the actual calibrating structure, e.g. with a straight first and second side of the calibrating structure correspondingly two straight lines.

In particular, the calibrating structure is defined by a third and a fourth side, which extend parallel to each other and each vertically impinge on the first and the second side, i.e. the calibrating structure has the shape of a rectangle "developed" onto the projection surface.

In an exemplary development of the method of the invention according to step d)

- a first pair of points is determined, which lies on a first edge portion (a first side) of the image of the calibrating structure, which corresponds to the first side of the actual calibrating structure,
- a second pair of points is determined, which lies on a second edge portion (a first side) of the image of the calibrating structure, which corresponds to the second side of the actual calibrating structure,
- a third pair of points is determined, whose points correspond to points of the actual calibrating structure, which lie in a region of the projection surface which has the largest distance to a plane in which the first and the second side of the calibrating structure lie, i.e. in a region of the projection surface which has the largest spatial curvature or depth, and
- e.g. the steps e) to g) initially are carried out for the first, second and third pair of points.

It should be noted that selecting a third pair of points in the region of the projection surface with the largest spatial curvature or depth is not absolutely necessary and is effected in particular when the camera image or the camera image transformed by homography transformation (i.e. the "image" of the projection surface) reveals which region of the projection surface has the largest distance to a plane in which the first and the second side of the calibrating structure lie, i.e. which region of the projection surface has the largest spatial depth. It is, however, also conceivable that a third pair of points is selected, which is only adjacent or at a distance to the region of the projection surface with the largest spatial depth.

Beside the determination of said first, second and third pair of points further pairs of points can of course be selected, for which (e.g. after carrying out the steps e) to g) for the first, second and third pair of points) supporting paths likewise are determined. In particular, these further supporting paths have the length and orientation of the supporting paths previously determined by optimization, which belong to the first, second and third pair of points, and each so to speak are "fitted" into their associated pair of auxiliary paths, so that their first end each contacts the first auxiliary beam and their second end each contacts the second auxiliary beam of the auxiliary beam pair.

In accordance with another exemplary aspect of the invention, the first and the second side of the calibrating structure are formed by a first and a second edge of the projection surface, i.e. the calibrating structure defines a portion of the projection surface or the entire projection surface. Thus, e.g. two opposite lateral edges of the projection surface or other structures which define the projection surface form the first and the second side of the calibrating structure, wherein the calibrating structure e.g. is formed exclusively by lateral edges or other structures defining the projection surface. In accordance with a variant of the method for recognizing said first and second edge of the projection surface, an image (generated by one or more projectors, e.g. a white or grey image) is projected, which overlaps the edge of the projection surface.

Alternatively or in addition, the calibrating structure can at least partly be arranged on the projection surface or be projected onto the projection surface, for example the calibrating structure is fixed (e.g. glued) on the projection surface in the form of a material strip, or the calibrating structure is projected onto the projection surface by means of a laser beam. The calibrating structure in particular is arranged such that the first and/or the second side extends parallel or vertical to an edge of the projection surface or to other structures defining the projection surface.

It is also conceivable that the calibrating structure at least partly is not arranged on the projection surface, but only subsequently is added to the image of the projection surface, e.g. by means of a corresponding image processing. In particular, an edge structure or some other prominent structure of the projection surface is utilized, which e.g. is only partly contained in the camera image or not at all, but whose extension can be determined by a viewer and be put in relation to structures contained in the camera image, e.g. an edge of a side wall of an interior space. According to this variant, the calibrating structure hence is not or at least not in part generated or arranged on the projection surface, but merely added to the camera image of the projection surface such that it corresponds to an image of a calibrating structure generated or arranged on the projection surface (as described above). The method variants described above and below are analogously applicable to this calibrating structure merely added to the camera image (e.g. drawn in manually or automatically). It is of course also conceivable that parts of the calibrating structure are generated by laser or arranged on the projection surface and other parts are added subsequently.

As already mentioned above, the projection surface in principle can have any extension in space, on the condition that it can be imagined to be generated by a vertical sweep in the region of the calibrating structure. This prerequisite provides for finding a solution by the reconstruction algorithm of steps e) to i), wherein nevertheless several solutions exist which satisfy the condition of step h), namely to find supporting paths of equal length, which impinge on a common plane. However, these possible solutions merely lead to differently scaled or positioned reconstructions of the projection surface.

The method according to the invention in particular can be carried out for a projection surface which in the region of the calibrating structure has a first portion and a second portion which extends angled or curved with respect to the first portion. This comprises e.g. the configuration that the projection surface in the region of the calibrating structure is at least partly formed as lateral surface of a cylinder or a cylinder segment or e.g. also extends in a wave-like manner.

The first portion of the projection surface also can extend along a first plane and the second portion of the projection surface can extend along a second plane. The first and the second portion thus each extend in a planar manner, wherein the first and the second plane however are oriented at an angle to each other, i.e. the projection surface includes a kink or a corner. The projection surface can of course include a plurality of kinks, i.e. it comprises a plurality of at least substantially planar portions which are oriented at an angle to each other. In the region of the calibrating structure, the projection surface can of course include both curvatures and kinks. In one variant, a side wall of an interior space over one corner or also a piece of furniture serves as projection surface, wherein the projected image extends beyond the piece of furniture onto an environment of the piece of furniture, e.g. a wall.

In a further exemplary aspect of the invention, the following steps are provided in addition:
i) generating a transformed image of the calibrating structure by transforming the image of the calibrating structure from the image plane of the camera into an auxiliary plane such that the edge of the transformed image of the calibrating structure has a first and a second side, which extend parallel to each other;
ii) selecting a plurality of pairs of points of the transformed image of the calibrating structure, which each include a first and a second point of an edge of the transformed calibrating structure, wherein the first and the second point each are located opposite each other along the first or the second side of the transformed image of the calibrating structure;
iii) selecting pairs of points according to step d) by identifying pairs of points in the image of the calibrating structure, which correspond to the selected pairs of points of the transformed image of the calibrating structure.

In particular, identifying the pairs of points according to step iii) is effected by back-transformation of the coordinates of the selected pairs of points of the transformed image into the image plane. For example, the calibrating structure forms four corner points at which the first and the second side of the calibrating structure meet with a third and a fourth side at right angles, so that the transformed calibrating structure forms a rectangle in the auxiliary plane. With this information, a transformation rule (in particular in the form of a homography matrix) can be determined for generating the transformed image of the calibrating structure. Here, the side lengths of the generated rectangular transformed calibrating structure are irrelevant, as for the subsequently described rectification of the projection no reconstruction of the projection surface true to scale is required.

As mentioned above, transforming the image of the calibrating structure from the image plane into the auxiliary plane for example is effected by means of a homography matrix and the back-transformation is effected by means of the inverted homography matrix. If the inverted homography matrix cannot be calculated (which is the case when the determinant of the non-inverted matrix is zero), a new homography matrix can be determined for back-transformation, but then source and target points are interchanged.

For generating a calibrated projection in accordance with another exemplary development of the invention
a) at least one calibration pattern is projected onto the projection surface,
b) an image of the calibration pattern is generated with the camera, and
c) with reference to the image of the calibration pattern and the reconstructed extension of the projection surface in the region of the calibrating structure warping parameters are determined for calibrating the projection.

For example, the projected calibration pattern in the object plane of the projection, i.e. the calibration pattern proceeding from the projector, includes a uniform raster of lattice points, wherein the projection is calibrated with respect to the calibrating structure such that along the first and the second side and/or vertical to the first and the second side the projected lattice points have an at least substantially constant distance to each other. In the case of a plurality of projectors, each of the projectors projects its own calibration pattern (each with a constant distance of the lattice points in the object plane of the projection), wherein the calibration for example is effected such that regions of the calibration patterns of the individual projectors are superimposed and in the calibrated image the same image contents then are represented in these superposition regions.

With such calibration a projection is generated, which is calibrated with respect to the extension of the projection surface and not with respect to a certain position of the camera or a viewer of the projection. In particular, an image can be projected which is rectified to the projection surface, i.e. the projected image appears like a wallpaper which is developed onto the (curved and/or kinked) projection surface. In particular, the projection can be oriented such that the lateral edges of the projected image extend parallel to the lateral edges of the projection surface. Such calibration with respect to the projection surface, i.e. a calibration independent of the viewer position, appears correct to the viewer, since human perception is based on the orientation on corners and edges of structures present in the space, e.g. the lateral edges of the projection surface.

In a further exemplary aspect of the invention, the calibration pattern includes a plurality of first (e.g. horizontal) and/or second (e.g. vertical) strips each parallel to each other in the object plane of the projection, wherein the first strips extend vertical to the second strips and the points of intersection of the first with the second strips form the lattice points of the calibration pattern. Other types of calibration patterns are of course also conceivable, e.g. sinusoidal patterns, markers and/or colored calibration strips. For example, the first and the second strips are projected one after the other, wherein one image of the projected strips each is recorded. It is, however, also possible that the first and the second strips are projected together.

In particular, for calibrating the projection the respective position of the lattice points in the image plane of the camera is employed, wherein
b) a projection of these lattice points by the camera onto the projection surface in the region of the calibrating structure is modeled by using the projection surface reconstructed in the region of the calibrating structure,
c) determining the warping parameters comprises the determination of the respective position of the depicted lattice points on the projection surface in the form of uv-coordinates of the depicted lattice points, and
d) with reference to these uv-coordinates the calibration of the projection is effected.

In particular, for determining the uv-coordinates a lattice point in the image plane of the camera is intersected with the reconstructed projection surface and the uv-coordinates of the points of intersection are determined. For example, the uv-coordinate system is chosen such that a first corner, e.g. the lower left corner, of the calibrating structure corresponds to the coordinates (0.0; 0.0) and a second corner arranged diagonally to the first corner, e.g. the upper right corner, of the calibrating structure corresponds to the coordinates (1.0; 1.0).

The uv-coordinates of the points of intersection are determined by means of the distance of the points of intersection (in the reconstructed model of the projection surface) to the edges of the calibrating structure. The correction then is effected—as known per se—by image warping (in this case by uv-texture-lookup). In particular, an image between the determined uv-coordinates of the points of intersection (source region) and the coordinates of the lattice points of the calibration pattern is determined in the object plane of the projection (target region). The source region thus is depicted in the target region. If this is effected for all e.g. triangular or rectangular target regions—formed of the points of intersection—and their corresponding source regions, a calibrated projection is obtained.

When using several projectors for generating the projected image on the projection surface, it is also possible in addition to correct the projection in overlap regions of the individual projected images. For this purpose, the image of all corrected projections (already corrected by image warping) is modulated with a blend image. Rectification and blending can be effected in real time. This rectification in real time (real-time calibration) is effected e.g. by means of a computer program or a correspondingly programmed microprocessor and for example can also be implemented on the driver side. The result is a calibrated image with respect to the projection surface extending in the space and—when using several projectors—in addition also with regard to the projected individual images relative to each other.

It is also conceivable that the real-time calibration is effected in the projector or projectors, wherein e.g. a correspondingly programmed electronic component is present in the projectors or a corresponding software program is executed on an electronic component present in the projectors. The calibration can of course also be carried out with a programmed device separate from the projectors.

A further exemplary embodiment of the invention relates to an apparatus for generating a calibrated projection on a projection surface, comprising a) reconstruction means for reconstructing the spatial extension of the projection surface in the region of the calibrating structure, wherein the reconstruction means b) include a calibrating structure following the extension of the projection surface and/or means for generating a calibrating structure on the projection surface, wherein the calibrating structure has a first side and a second side which extends parallel to the first side, and a constant height as measured in direction of the first or the second side, and starting from an image of the calibrating structure are formed to c) determine a plurality of pairs of points of the image of the calibrating structure, which each include a first and a second point of the image of the calibrating structure, wherein the first and the second point each correspond to a first and a second point of the actual calibrating structure, which are located opposite to each other along the first or the second side of the calibrating structure;

d) generate a plurality of auxiliary beam pairs which each include two auxiliary beams which extend from the first and the second point of the pairs of points to an imaginary vanishing point before the image plane;

e) generate a plurality of supporting paths parallel to each other, which each begin on one of the auxiliary beams of one of the auxiliary beam pairs and end on the respective other auxiliary beam of one of the auxiliary beam pairs;

f) vary the length and/or the orientation of the supporting paths, until all supporting paths have the same length and each impinge on a common plane under the same angle;

g) generate a model of the projection surface by using the supporting paths found according to step f), wherein these supporting paths are path sections of the sought projection surface, which extend parallel to the first and second side of the calibrating structure; and h) calibrating means for generating a projection calibrated in particular with respect to the calibrating structure by using a spatial extension of the projection surface reconstructed by the reconstruction means.

The apparatus according to the invention in particular also comprises at least one projector (whose projection should be calibrated) for generating a projection on a projection surface and/or at least one camera for generating an image of the calibrating structure in an image plane. However, the apparatus very well can also be utilized with an already existing projector and/or an already existing camera, i.e. the projector and/or the camera are not necessarily part of the apparatus according to the invention.

In particular, the calibrating means comprise means for projecting a calibration pattern onto the projection surface as described above with respect to the method according to the invention. Furthermore, the calibrating means also can include means for generating warping parameters with reference to the spatial extension of the projection surface reconstructed by means of the reconstruction means in the region of the calibrating structure and of the projected calibration pattern. The calibrating means in particular are formed to implement the method described above for generating the calibrated projection, i.e. in particular the generation of a calibration pattern and the determination of warping parameters by using uv-coordinates. For example, the reconstruction means and/or the calibrating means are implemented in the form of a software program or a programmed device, which e.g. for projecting a calibration pattern cooperates with at least one projector (and e.g. can also be integrated into a projector).

The apparatus also can include means (e.g. an image processing software or an image processing apparatus) for generating a calibrating structure in an image of the projection surface, i.e. sections of a calibrating structure present or projected on the projection surface can be completed by subsequently inserting (drawing in) further sections.

The invention also comprises a system of the described apparatus and a projection surface.

In a further exemplary aspect, the invention also relates to an apparatus for generating a calibrated projection on a projection surface, comprising a) reconstruction means for reconstructing the spatial extension of the projection surface in the region of the calibrating structure, wherein the reconstruction means b) include means (e.g. an image processing software or an image processing apparatus) for generating a calibrating structure in an image of the projection surface, wherein the generated calibrating structure is geared to characteristic structures of the projection surface such that it corresponds to an image of a calibrating structure arranged (but actually not present) on the projection surface, which has a first side and a second side which extends parallel to the first side, and has a constant height as measured in direction of the first or the second side, and wherein the reconstruction means are formed to c) determine a plurality of pairs of points of the calibrating structure, which each include a first and a second point of the calibrating structure, which correspond to points of a calibrating structure arranged on the projection surface, which are located opposite to each other along the first or the second side of the calibrating structure;

d) generate a plurality of auxiliary beam pairs which each include two auxiliary beams which extend from the first and the second point of the pairs of points to an imaginary vanishing point before the image plane;

e) generate a plurality of supporting paths, which each begin on one of the auxiliary beams of one of the auxiliary beam pairs and end on the respective other auxiliary beam of the auxiliary beam pair;

f) vary the length and/or the orientation of the supporting paths, until all supporting paths have the same length and each impinge on a common plane under the same angle;

g) generate a model of the projection surface by using the supporting paths found according to step f), wherein these supporting paths are path sections of the sought projection surface, which extend parallel to the first and second side of the calibrating structure; and h) calibrating means for generating a calibrated projection by using a spatial extension of the projection surface reconstructed by the reconstruction means.

BRIEF DESCRIPTION OF THE DRAWINGS

The invention will subsequently be explained in detail by means of exemplary embodiments with reference to the Figures:

FIG. 7 shows a process diagram of a further exemplary embodiment of the method according to the invention FIGS. 8A and 8B show a schematic diagram to illustrate the generation of a calibrated projection by using uv-coordinates.

DETAILED DESCRIPTION

Figure 1A:
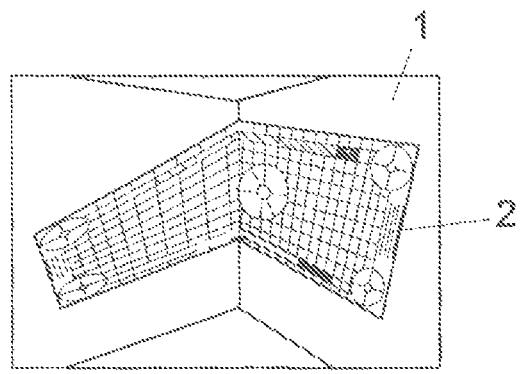
FIG. 1A shows a conventionally projected image as seen from a camera positioned before the projection surface.
Figure 1B:
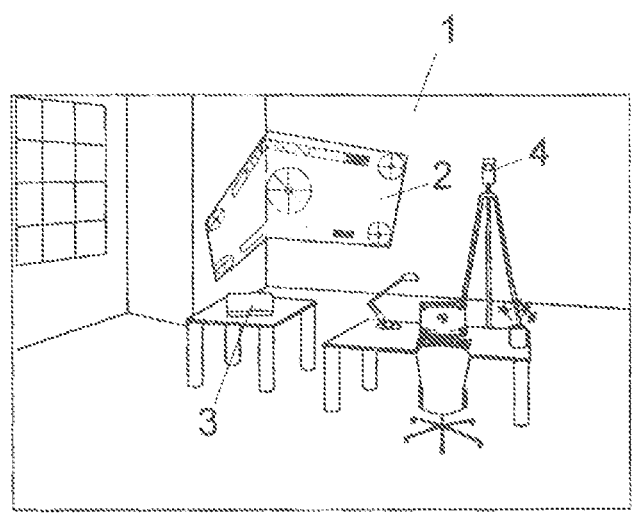
FIG. 1B shows the projection of FIG. 1A from a viewer position different from the camera position.

FIGS. 1A and 1B each show an uncalibrated projection image 2 projected onto a projection surface 1 by means of a projector 3, wherein FIG. 1A shows the projection image as seen from a camera 4 positioned before the projection surface, whereas FIG. 1B represents the projection image 2 as seen from a viewer position different from the camera position. The projection image 2 is distorted in dependence on the position of the projector 3 relative to the projection surface 1. In particular, the fact that the projection surface 2 is formed as part of an inner wall of a space which extends beyond a corner of the inner wall ensures that a strongly distorted projection image is obtained.

Figure 2A:
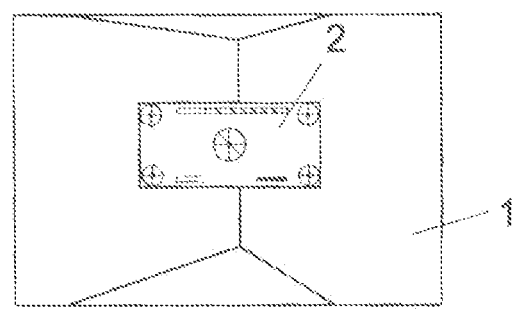
FIG. 2A shows the projection of FIGS. 1A and 1B after calibration with respect to the camera position.
Figure 2B:
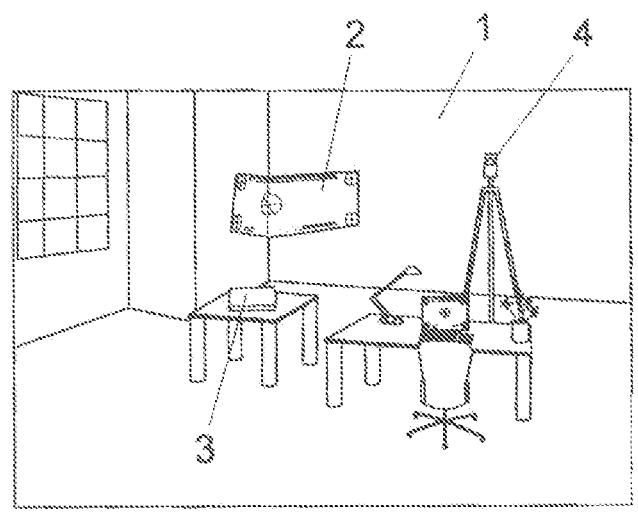
FIG. 2B shows the calibrated projection of FIG. 2A from the viewer position of FIG. 1B.

A possibility of generating a calibrated projection is illustrated in FIGS. 2A and 2B. The calibration of the projection image 2 here is effected such that it appears to be rectified with respect to the camera viewpoint, i.e. the projection image 2 is calibrated such that it is rectified in direction of the lateral edges of the camera image and the lateral edges of the projection extend parallel to the lateral edges of the camera image. However, the projection image calibrated in this way appears to be correct only from the perspective of the camera, but as soon as another position is chosen with respect to the projection surface 1, the image appears to be distorted, as can be seen in FIG. 2B. In particular, such projection which is not oriented parallel to boundary edges (e.g. between the side wall and the floor and/or the ceiling) of the interior space is perceived as not correct for perceptive-psychological reasons.

With the method of the invention, according to which the extension of the projection surface 1 (which has a kink according to the example of FIGS. 1 to 3) is reconstructed and the projection image is calibrated by using this reconstructed extension of the projection surface, a calibration of the projection image in particular is possible with respect to the lateral edges of the projection surface. According to FIG. 3A, the projection image 2 is calibrated such that its upper and lower lateral edges 21, 22 extend parallel to an upper and a lower lateral edge 11, 12 of the projection surface 1, wherein in this example the lateral edges 11, 12 are formed by an angle extending between the side wall of an interior space forming the projection surface and a ceiling or a floor of the interior space.

The projection image 2 is calibrated (rectified) with respect to the projection surface such that structures which have equal distances in the object plane of the projection likewise have equal distances along the projection surface and parallel and vertical to the lateral edges 11, 12 of the projection surface 1, so that it seems that the projection image 2 is "glued" onto the projection surface 1 in the manner of a wallpaper. Due to this calibration, the projected image 2 appears correct independent of the viewer position; cf. FIG. 3B.

Figure 3A:
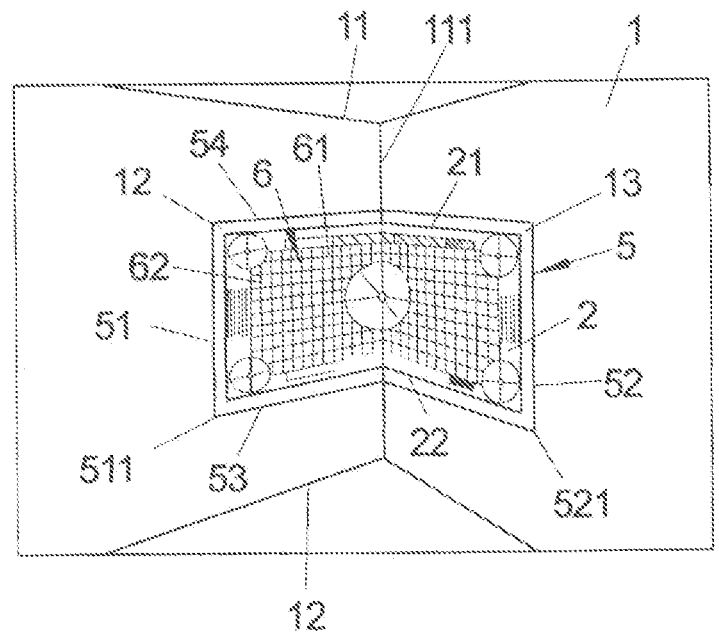
FIG. 3A shows a calibrated projection generated according to a first exemplary embodiment of the invention as seen from the camera.
Figure 3B:
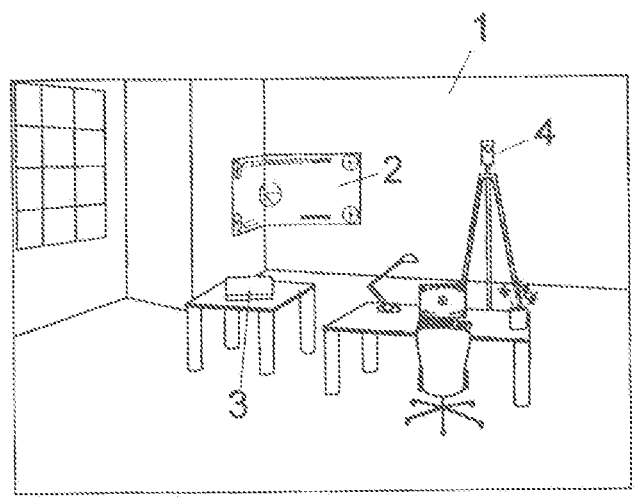
FIG. 3B shows the calibrated projection of FIG. 3A from the viewer position of FIGS. 1B and 2B.

To be able to generate the calibration shown in FIGS. 3A and 3B with respect to the projection surface, the extension of the projection surface 1 is reconstructed in a first part of the method as mentioned above. For this purpose, the projection surface 1 includes a calibrating structure 5 which has a first side 51 and a second side 52 parallel to the first side. Furthermore, the calibrating structure 5 has a connecting line in the form of a third (lower) side 53, which connects a first (lower) end 511 of the first side 51 with a first (lower) end 521 of the second side 52. Furthermore, the calibrating structure 5 has a fourth side 54 which extends parallel to the third side 53.

In the region of the calibrating structure 5, i.e. here in a region within the calibrating structure 5, the projection surface 1 extends in the form of a surface which can be formed by shifting the third side 53 along the first and the second side 51, 52 (i.e. upwards). In other words, in the region of the calibrating structure 5 the projection surface 1 does not extend along a single surface in a planar manner like a conventional projection surface, but extends in the space due to the fact that a first portion 12 is bent off from a second portion 13 along a line 111 (a corner of the side wall). For example, the calibrating structure 5 is projected onto the projection surface 1 by means of a laser and in particular extends such that its third and fourth sides 53, 54 are oriented parallel to the upper and lower lateral edges 11, 12 of the projection surface 1. Of course, the calibrating structure 5 also can be designed such that it defines a surface which corresponds to the surface of the projected image or which is smaller than the surface of the projected image, so that the projection 2 extends beyond the calibrating structure 5.

In another variant, the calibrating structure is at least partly generated by the fact that it is subsequently added to the image of the projection surface recorded by means of the camera, for example by the fact that lines are (manually or automatically) added to the image of the projection surface, which extend parallel to characteristic structures of the projection surface, e.g. parallel to the side wall edges 11, 12 and/or the kink 111.

The calibrated projection 2 also includes test structures 6 in the form of a plurality of first (horizontal) strips 61 and a plurality of second (vertical) strips 62. The points of intersection of the first strips 61 with the second strips 62 form lattice points of a uniform lattice in the object plane of the projection. The calibration of the projected image has been effected such that along the first and the second side 51, 52 of the calibrating structure 5 and/or along the third and the fourth side 53, 54 of the calibrating structure (along the projection surface 1) these lattice points have a constant distance to each other.

Figure 4:
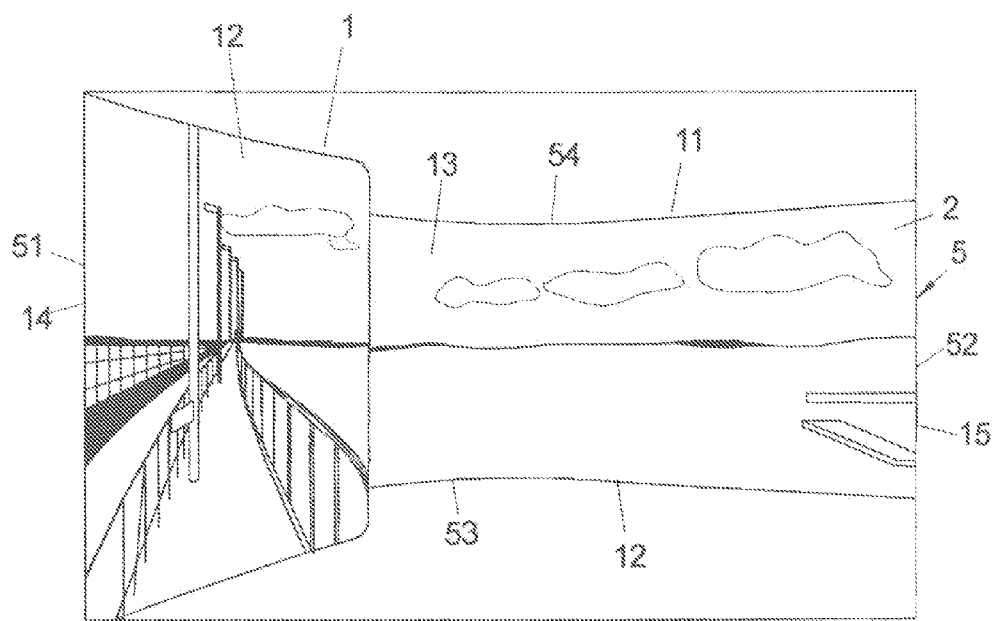
FIG. 4 shows a calibrated projection generated according to a second exemplary embodiment of the method of the invention.

FIG. 4 shows a further example of a projection calibrated by means of the method according to the invention. The projected image 2 follows a curved projection surface 1 in the manner of a wallpaper, which projection surface is defined by (horizontal) lateral edges 11, 12 and (vertical) lateral edges 14, 15.

To achieve such calibration, the extension of the projection surface again is reconstructed by using a calibrating structure 5. In the example of FIG. 4, the lateral edges 11-15 of the projection surface 1 serve as calibrating structure, wherein the first vertical lateral edge 14 forms the first side 51 of the calibrating structure and the second vertical lateral edge 15 forms the second side 52 of the calibrating structure 5. The two sides 51, 52 are connected with each other via a first (lower) connecting line 53, which corresponds to the (lower) horizontal lateral edge 12 of the projection surface, and a second (upper) connecting line 54, which corresponds to the (upper) lateral edge 11 of the projection surface. The projection surface in turn extends without bumps and dents, i.e. it is formed in the form of a surface curved and/or angled about an axis extending vertically, i.e. parallel to the edges 51, 52 of the calibrating structure.

In other words, the projection surface 1 is formed by vertically shifting the lower connecting line 53 along the sides 51, 52. In the present example, the projection surface 1 has a first portion 12, which extends with a curvature relative to a second portion 13, wherein the projection surface includes a plurality of curvatures (in part of different sign). Of course, the method according to the invention covers projection surfaces in principle with arbitrary combinations of curvatures and kinks.

It should be noted that the representations of FIGS. 3A, 3B and 4 actually correspond to a camera image of the projection surface and the calibrating structure, which is why e.g. in FIG. 4 the lateral edge 14 appears longer than the opposite lateral edge 15. Since the actual extension of the lateral edge of the projection surface (and hence of the lateral edge of the calibrating structure) is known, the spatial extension of the projection surface in the region of the calibrating structure can be determined from the difference between the image of the calibrating structure and the actual extension of the calibrating structure, as described above.

Figure 5A:
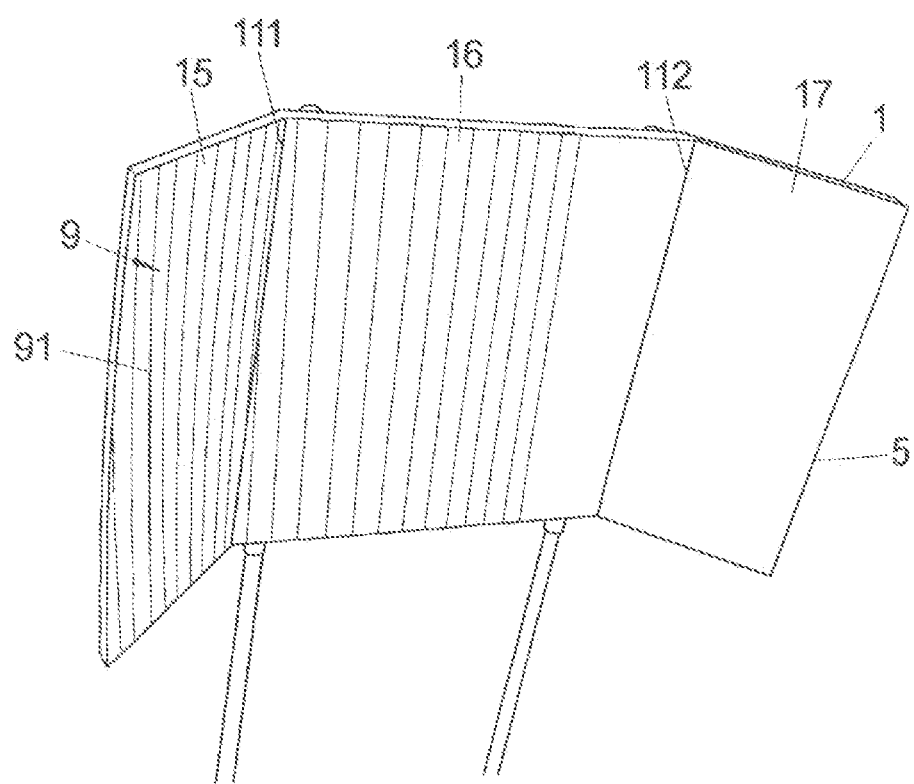
FIG. 5A shows a projection of vertical calibration strips of a projector.

FIGS. 5A to 5D relate to the projection of calibration patterns for producing a calibrated projection in accordance with the method of the invention. For example, FIG. 5A shows a projection surface 1 (in the form of a screen) which has two kinks 111, 112, so that the projection surface 1 includes three portions 15-17 which each extend at an angle with respect to an adjacent portion. In this example, the edge of the projection surface defines the calibrating structure 5 for reconstruction of the spatial extension of the projection surface.

Figure 5B:
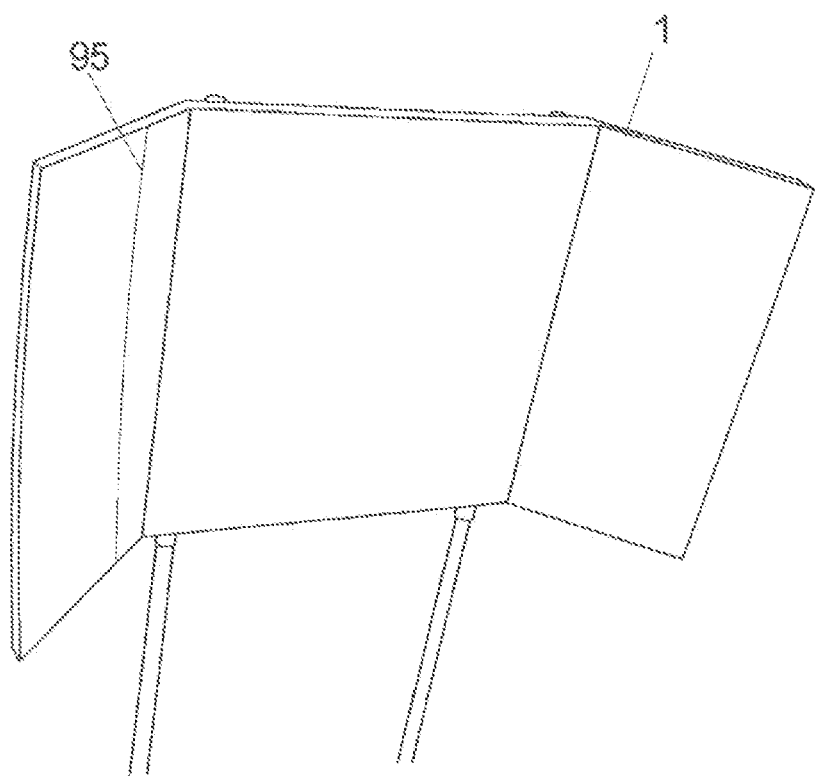
FIG. 5B shows a projection of a vertical reference strip of the projector of FIG. 5A.

Onto the projection surface a calibration pattern 9 is projected, which comprises a plurality of first (vertical) calibration strips 91 and is recorded with the camera, wherein the calibration strips also are distorted due to the camera lens distortion (not yet corrected). Since possibly not all of the calibration strips present (in the object plane of the projection) also are projected onto the projection surface (but beside the projection surface), a reference pattern is projected, by means of which it can be determined which of the calibration strips are projected onto the projection surface. For example, the reference pattern, as shown in FIG. 5B, consists of an individual reference strip 95 which corresponds to one of the projected calibration strips and whose position with respect to the remaining calibration strips (in the object plane of the projection) is known. Proceeding from the position of the reference strip 95 on the projection surface (i.e. relative to the lateral edges of the projection surface) it can be determined which of the calibration strips 91 are projected onto the projection surface 1.

Figure 5C:
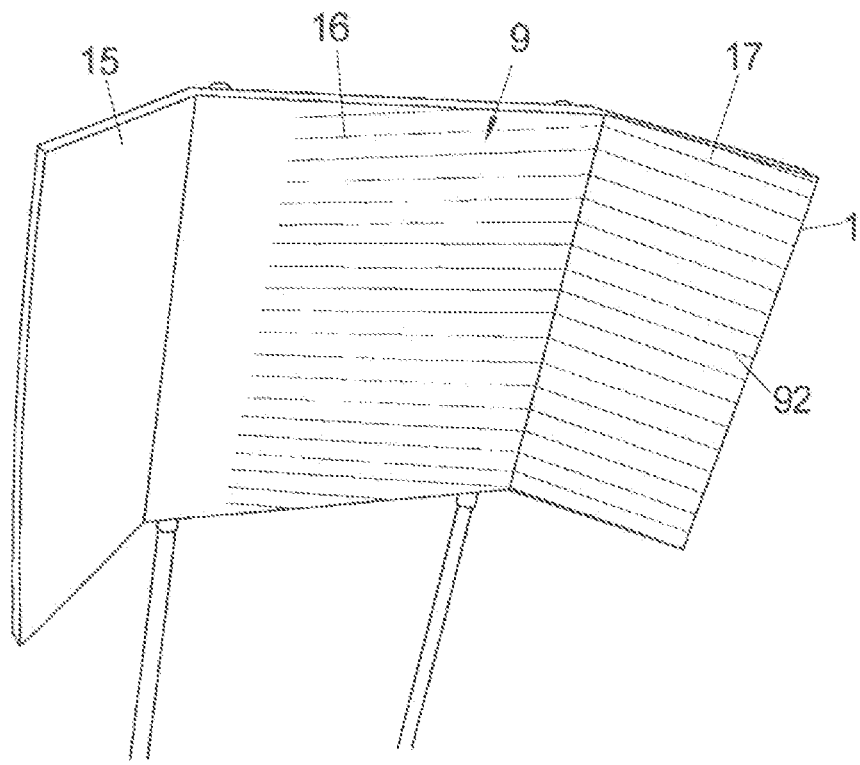
FIG. 5C shows a projection of horizontal calibration strips of a further projector.
Figure 5D:
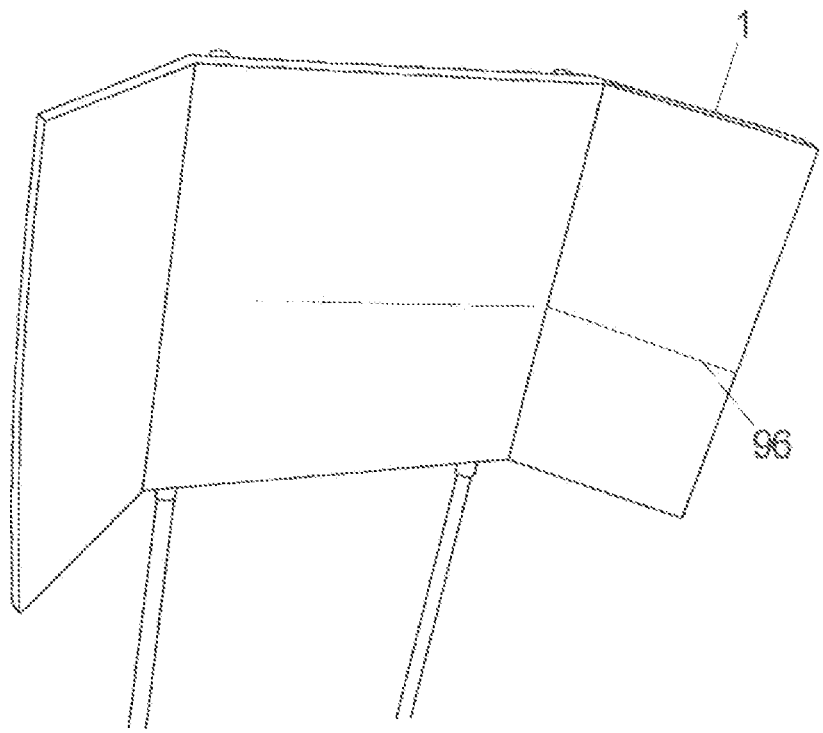
FIG. 5D shows a projection of a horizontal reference strip of the projector of FIG. 5C.

FIGS. 5C and 5D relate to the projection of horizontal calibration strips 92 or of a horizontal reference strip 96. The vertical strips 91 and the horizontal strips 92 can of course also be projected together. The reference strips 95, 96 also can be projected together with the calibration patterns, and for example they can also include additional structures for differentiation from the actual calibration pattern. If several projectors are used, in particular each one of the projectors projects a calibration pattern or the calibration patterns.

Figure 6:
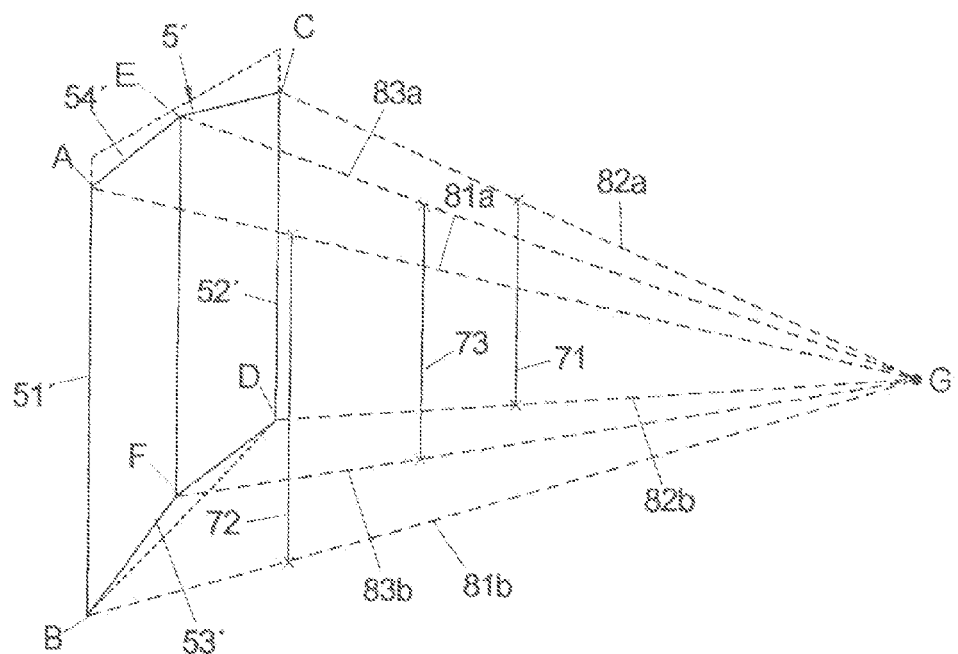
FIG. 6 shows a schematic representation of a method step of the method according to the invention.

FIG. 6 illustrates a method step during the reconstruction of the projection surface according to the method of the invention. An image 5' (camera image) of the calibrating structure is generated (in the image plane of a camera, indicated by a dashed frame), which has the sides 51' to 54'. The sides 51' and 52' extend linearly (but not necessarily parallel to the edges of the camera image) and correspond e.g. to an image of the sides 51 and 52 of the calibrating structure 5 in FIG. 3B. The lower side 53' corresponds to the lower side 53 and the upper side 54' to the upper side 54 of the calibrating structure 5, wherein the sides 53' and 54' do not extend linearly due to a kink (corresponding to the kink 111 in FIG. 3A) in the projection surface, but each are bent off at a point in which the projection surface has its greatest spatial extension.

Starting from the image 5' of the calibrating structure, a plurality of pairs of points are selected, three of which are shown in FIG. 6, namely a first pair which contains the points A and B which at the same time are corner points of the depicted calibrating structure 5' and which form ends of the first side 51' located opposite each other, and a second pair which includes the points C and D which form the ends of the second side 52'. Since they are corner points of the depicted calibrating structure 5', the selected points A and B as well as C and D correspond to points (likewise corner points) of the actual calibrating structure (not shown), which are located opposite each other along the first and the second side of the actual calibrating structure. In addition, a further pair of points (E, F) is selected at the kink of the sides 53' and 54'.

Starting from the pairs of points (A,B), (C,D) and (E,F) three auxiliary beam pairs are formed, which each include two auxiliary beams 81*a*, 81*b*; 82*a*, 82*b* and 83*a*, 83*b* which extend from the first and the second point A, B; C, D and E, F of the pairs of points to an imaginary vanishing point F before the image plane of the camera (or generally before a plane in which the image 5' of the calibrating structure extends). In addition, a plurality of supporting paths 71, 72, 73 parallel to each other are generated, which each begin on one of the auxiliary beams 81a, 82a, 83a and end on the respective other auxiliary beam 81b, 82b, 83b of the auxiliary beam pairs.

The supporting paths 71, 72, 73 are varied in their length and orientation, until they have the same length and each impinge on a common plane (not shown) under the same angle (optimization method). By means of the supporting paths thus found, the projection surface then is reconstructed in the region of the calibrating structure, wherein the supporting paths found are portions of the sought projection surface, which are oriented parallel to the first and the second side of the calibrating structure. The projection surface found in this way is not necessarily true to scale with the actual projection surface, which does however not play a role for generating the calibrated projection.

Of course, more than three pairs of points can be selected, in order to reconstruct the projection surface. In addition, it should be noted that others than the pairs of points shown in FIG. 6 can also be selected. In particular, the third pair of points need not necessarily be selected from a region of the projection surface which has the greatest spatial curvature or depth.

FIG. 7 shows a process diagram of a further exemplary embodiment of the method according to the invention. Accordingly, various calibration images are projected onto a projection surface in a first step 100. The same include a black image 101 which is subtracted from the remaining calibration images, in particular to remove disturbing background objects and noise.

Furthermore, a white image 102 is projected, which in particular serves to determine edges and corners of the projection surface, in order to be able to utilize the same as calibrating structure for reconstructing the spatial extension of the projection surface.

Furthermore, a first calibration pattern 103 is projected, which includes a plurality of vertical strips, and a second calibration pattern 104 which includes a plurality of horizontal strips. Furthermore, reference strips 105 are projected, which serve to be able to unambiguously identify the strips of the calibration patterns 103, 104.

The projected calibration images 101-105 are recorded with a digital camera, wherein e.g. each of the calibration images is recorded separately. It is, however, also conceivable that some of the calibration images are projected at the same time and are also recorded together, e.g. the calibration patterns 103 to 105. Furthermore, it is of course also possible that several projectors are used for generating the projection image, so that the calibration images to be projected according to step 100 are projected and recorded one after the other by each of the projectors used.

It is possible that some of the projected strips of the calibration patterns 103, 104 no longer are captured by the camera and/or lie outside the projection surface, so that it cannot clearly be determined with reference to the camera image which of the projected calibration strips lie in the region of the projection surface. A clear allocation of the projected calibration strips depicted by the camera, however, is expedient for a determination of the warping parameters for calibrating the image to be projected. For the purpose of the clear allocation of the calibration strips the reference strips 105 are projected, which are designed such that by means of the same (in particular by means of their position relative to the calibration strips) the projected calibration strips can clearly be identified. For example, instead of strips reference patterns of another geometry can be used or also the coded light-sectioning technique.

The recorded calibration patterns 103 to 105 are binarized e.g. according to step 200, in particular to correct adulterations by effects such as sampling, lens distortion, zoom, blooming or anti-aliasing. In particular, a binary filter threshold is determined by means of a histogram, wherein an influence of vignetting can also be taken into account. By means of this binary filter threshold, a black-and-white filtering of the image of the calibration patterns 103 to 105 is effected, wherein e.g. possibly occurring errors within the filtered strips can also be filled with morphological operations.

The calibration patterns processed in this way, which e.g. can have a width of several pixels, in particular can also each be treated with two vertical (in opposite directions) and/or two horizontal (likewise in opposite directions) offset filters, so that edges of the projected strips each are extracted (left and right edge of the vertical strips or upper and lower edge of the horizontal strips). The strip edges thus determined are used for the subsequently performed determination of the points of intersection of the vertical and the horizontal strips.

Filtering the projected calibration strips can also be effected with a gradient method.

In a further step 300 a determination of parameters for an ad-hoc lens rectification is effected. This determination of parameters in particular is effected by using the known extension of the calibrating structure, i.e. in the present example with reference to the extension of the straight side edges of the projection surface, as already described above.

Based on the projected white image 102, the edge recognition of the projection surface is effected (step 400), wherein e.g. a bilateral vertical and/or horizontal offset filter is applied to the white image. For example, proceeding from this filtered white image the corner points of the projection surface (in the image plane of the camera) can be determined by averaging the end or starting points of two adjacent edge segments. Furthermore, the determination of the points of intersection of the projected first (horizontal) and second (vertical) calibration strips 103, 104 is effected according to step 500. Proceeding from the binarized image of the calibration strips 103, 104 the points of intersection of their edges are determined. Thus, per point of intersection of a vertical with a horizontal strip four points of intersection of the respective edges of the strips are obtained, on the basis of which the sought point of intersection of the calibration strips is determined by averaging. The position of the points of intersection thus found (which form lattice points of a calibration lattice) is corrected in particular by using the determined lens distortion, so that points of intersection adjusted for camera-induced distortions are available.

If the calibration strips have been filtered with a gradient method, these calibration strips only are represented by a line sequence. Thus, only one point of intersection is present, in which merely the lens distortion must be corrected.

The points of intersection of the calibration strips 103, 104 determined as described above lie within the projected image, i.e. with a certain distance to the lateral edge of the projection surface. To be able to expand the calibration into the edge region of the projected image, an edge of the point of intersection surrounding the projected image is extrapolated. For this purpose, it is assumed for example that the distance of the calibration strips is relatively small, so that a quadrangle defined by adjacent calibration strips in the image plane of the camera approximately corresponds to a quadrangle in a plane lying obliquely to the image plane. Under this assumption a transformation rule is determined, which is applied to a lattice point quadrangle at the edge of the projected image, in order to determine a point of intersection of a side of this lattice point quadrangle, i.e. of a line between a raster point inside the projection surface and a raster point outside the projection surface, with the edge of the projection surface.

In further steps 600, 700 a homography transformation is effected for generating a transformed image of the calibrating structure in an auxiliary plane, in order to select pairs of points and identify the same in the image of the calibrating structure by means of an inverse homography transformation, as described above. The pairs of points thus identified serve the construction of the supporting paths as explained with reference to FIG. 5.

Finally, the reconstruction 800 of the projection surface is effected by using the properties ("constraints") of the calibrating structure and the projection surface in the region of the calibrating structure, according to which in particular the first and the second side of the calibrating structure extend parallel to each other and the projection surface can be generated by a vertical sweep, as described above in detail. In one variant, the extension of the projection surface in the region of the calibrating structure is reconstructed by a wire grid model.

By using the projection surface reconstructed according to step 800, the calibration of the projection finally is effected, wherein in step 900 warping parameters are generated in the form of uv-coordinates and blend images. In particular, with reference to the position of the lattice points or the strips of the calibration patterns of different projectors and their uv-coordinates it can be determined which regions of the projection are visible (white in the blend image), which ones are located outside the projection surface (black in the blend image), and where overlap regions of the images projected by the different projectors are located (grey wedge in the blend image).

Rectifying and joining the partial images when using several projectors is effected in real time according to step 1000. For example, the image of a projector is transformed by means of the determined uv-coordinates ("uv-texture-lookup") and modulated with a corresponding blend image, so that a calibrated image is generated with respect to the projection surface and also with respect to the individual images relative to each other (when using several projectors).

It should be noted that in the exemplary embodiment of FIG. 6 it is not absolutely necessary to use all of the method steps described with reference to FIG. 6. It is also possible that some of the steps are omitted or some of the steps are realized in modified form. For example, for the exemplary embodiment of FIG. 6 it is not absolutely necessary that the lateral edge of the projection surface is used as calibrating structure, but a separate calibrating structure is used, so that e.g. projecting the white image 102 can be omitted.

FIGS. 8A and 8B illustrate the step 1000 of FIG. 7. According to FIG. 8A, a calibration pattern in the form of a lattice point raster 9, 9' is projected, of which a segment of four lattice points 99a'-d', 99a-d is shown. The left-hand representation of FIG. 8A shows the lattice point raster 9' in the object plane of the projection (or in a frame buffer of the projector), whereas the right-hand representation illustrates the projection 9 of the lattice point raster on a projection surface. The position of the projected lattice points 99a-d is determined by means of the above-described method by using the reconstructed extension of the projection surface in the form of uv-coordinates and a mapping rule (indicated by arrows) is determined between the coordinates of the lattice points 99a'-d' in the frame buffer of the projector and the projected lattice points 99a-d. The corresponding procedure is employed for the other lattice points of the calibration pattern; cf. FIG. 8B. The method described can of course be realized not only with rectangular segments of the lattice point raster, but e.g. also with triangular segments which are defined by three lattice points.

The invention claimed is:

1. A method for generating a calibrated projection on a projection surface, with the steps:
    a) arranging and/or generating a calibrating structure following a spatial extension of the projection surface, which has a first side and a second side, which extends parallel to the first side, and has a constant height as measured in direction of the first or the second side;
    b) generating an image of the calibrating structure in an image plane by means of a camera;
    c) reconstructing the spatial extension of the projection surface in the region of the calibrating structure, comprising the steps:
    d) determining a plurality of pairs of points of the image of the calibrating structure, which each include a first point and a second point of the image of the calibrating structure, wherein the first and the second point each correspond to a first and a second point of the calibrating structure, which are located opposite to each other along the first or the second side of the calibrating structure;
    e) generating a plurality of auxiliary beam pairs which each include two auxiliary beams, which extend from the first and the second point of the pairs of points to an imaginary vanishing point before the image plane;
    f) generating a plurality of supporting paths parallel to each other, which each begin on one of the auxiliary beams of one of the auxiliary beam pairs and end on the respective other auxiliary beam of the auxiliary beam pair;
    g) varying the length and/or the orientation of the supporting paths, until all supporting paths have the same length and each impinge on a common plane under the same angle;
    h) generating a model of the projection surface by using the supporting paths found according to step g), wherein these supporting paths are path sections of the sought projection surface, which extend parallel to the first and second side of the calibrating structure;
    i) generating the calibrated projection by using the model of the projection surface generated according to step h).

2. The method according to claim 1, wherein before the reconstruction according to steps d) to h) a correction of a lens aberration of the camera is made, wherein correction parameters are determined by determining a deviation of the extension of a first side and/or a second side of the image of the calibrating structure from the extension of a first side and/or a second side of the calibrating structure.

3. The method according to claim 1, wherein according to step d)
    a first pair of points is determined, which lies on a first edge portion of the image of the calibrating structure, which corresponds to the first side of the calibrating structure,
    a second pair of points is determined, which lies on a second edge portion of the image of the calibrating structure, which corresponds to the second side of the calibrating structure, and
    a third pair of points is determined, whose points correspond to points of the calibrating structure, which are located in a region of the projection surface which has the greatest distance to a plane in which the first and the second side of the calibrating structure lie, and
    the steps f) to h) initially are carried out for the first, second and third pair of points.

4. The method according to claim 1, wherein the first and the second side of the calibrating structure are at least partly formed by a first and a second edge of the projection surface.

5. The method according to claim 1, wherein the calibrating structure is at least partly arranged on the projection surface or projected onto the projection surface.

6. The method according to claim 1, wherein in the region of the calibrating structure the projection surface includes a first portion and a second portion which extends angled or curved with respect to the first portion.

7. The method according to claim 6, wherein
the projection surface is at least partly formed as lateral surface of a cylinder or a cylinder segment or extends in a wave-like manner, and/or
the first portion of the projection surface extends along a first plane and the second portion of the projection surface extends along a second plane, wherein the first and the second plane extend at an angle to each other.

8. The method according to claim 1, further comprising the steps:
i) generating a transformed image of the calibrating structure by transforming the image of the calibrating structure from the image plane of the camera into an auxiliary plane such that the edge of the transformed image of the calibrating structure has a first and a second side, which extend parallel to each other;
ii) selecting a plurality of pairs of points of the transformed image of the calibrating structure, which each include a first and a second point of an edge of the transformed calibrating structure, wherein the first and the second point each are located opposite each other in a direction along the first or the second side of the transformed image of the calibrating structure; and
iii) selecting pairs of points according to step d) by identifying pairs of points in the image of the calibrating structure, which correspond to the selected pairs of points of the transformed image of the calibrating structure.

9. The method according to claim 8, wherein identifying the pairs of points according to step iii) is effected by back-transformation of the coordinates of the points of the selected pairs of points of the transformed image into the image plane.

10. The method according to claim 9, wherein transforming the image of the calibrating structure from the image plane into the auxiliary plane is effected by means of a homography matrix and the back-transformation is effected by means of the inverted homography matrix.

11. The method according to claim 1, wherein
a) at least one calibration pattern is projected onto the projection surface;
b) an image of the calibration pattern is generated with the camera; and
c) with reference to the image of the calibration pattern and the reconstructed extension of the projection surface in the region of the calibrating structure warping parameters are determined for calibrating the projection.

12. The method according to claim 11, wherein
in the object plane of the projection the calibration pattern includes a uniform raster of lattice points,
the projection is calibrated with respect to the calibrating structure such that along the first or the second side and/or in a direction vertical to the first and the second side the projected lattice points have a constant distance to each other.

13. The method according to claim 12, wherein in the object plane of the projection the calibration pattern includes a plurality of first and/or second strips each parallel to each other, such that the first strips extend vertical to the second strips, wherein the points of intersection of the first with the second strips form the lattice points of the calibration pattern.

14. The method according to claim 12, wherein for calibrating the projection the respective position of the lattice points in the image plane of the camera is employed, wherein
a) a projection of these lattice points by the camera onto the projection surface in the region of the calibrating structure is modeled by using the projection surface reconstructed in the region of the calibrating structure,
b) determining the warping parameters comprises the determination of the respective position of the depicted lattice points on the projection surface in the form of uv-coordinates of the depicted lattice points, and
c) with reference to these uv-coordinates the calibration of the projection is effected.

15. A method for generating a calibrated projection on a projection surface, with the steps:
a) generating an image of the projection surface in an image plane by means of a camera;
b) reconstructing a spatial extension of the projection surface, comprising the steps:
c) generating a calibrating structure in the image of the projection surface, which is geared to characteristic structures of the projection surface such that it corresponds to an image of a calibrating structure arranged on the projection surface, which has a first side and a second side, which extends parallel to the first side, and has a constant height as measured in direction of the first or the second side;
d) determining a plurality of pairs of points of the generated calibrating structure, which each include a first point and a second point of the calibrating structure, which correspond to points of a calibrating structure arranged on the projection surface, which are located opposite to each other along the first or the second side of the calibrating structure;
e) generating a plurality of auxiliary beam pairs which each include two auxiliary beams, which extend from the first and the second point of the pairs of points to an imaginary vanishing point before the image plane;
f) generating a plurality of supporting paths parallel to each other, which each begin on one of the auxiliary beams of one of the auxiliary beam pairs and end on the respective other auxiliary beam of the auxiliary beam pair;
g) varying the length and/or the orientation of the supporting paths, until all supporting paths have the same length and each impinge on a common plane under the same angle;
h) generating a model of the projection surface by using the supporting paths found according to step g), wherein these supporting paths are path sections of the sought projection surface, which extend parallel to the first and second side of the calibrating structure;
i) generating a calibrated projection by using the model of the projection surface generated according to step h).

16. The method according to claim 15, the calibrating structure is generated by being added to the image of the projection surface by means of an image processing software.

17. An apparatus for generating a calibrated projection on a projection surface comprising
a) reconstruction means for reconstructing a spatial extension of the projection surface, wherein the reconstruction means
b) include a calibrating structure following the extension of the projection surface and/or means for generating a calibrating structure on the projection surface, wherein the calibrating structure has a first side and a second side, which extends parallel to the first side, and a constant height as measured in direction of the first or the second side, and starting from an image of the calibrating structure are formed to c) determine a plurality of pairs of points of the image of the calibrating structure, which each include a first point and a second point of the image of the calibrating structure, wherein the first and the second point each correspond to a first and a second point of the actual calibrating structure, which are located opposite to each other along the first or the second side of the calibrating structure;

d) generate a plurality of auxiliary beam pairs which each include two auxiliary beams, which extend from the first and the second point of the pairs of points to an imaginary vanishing point before the image plane;

e) generate a plurality of supporting paths, which each begin on one of the auxiliary beams of one of the auxiliary beam pairs and end on the respective other auxiliary beam of the auxiliary beam pair;

f) vary the length and/or the orientation of the supporting paths, until all supporting paths have the same length and each impinge on a common plane under the same angle;

g) generate a model of the projection surface by using the supporting paths found according to step f), wherein these supporting paths are path sections of the sought projection surface, which extend parallel to the first and second side of the calibrating structure; and h) calibrating means for generating a calibrated projection by using a spatial extension of the projection surface reconstructed by the reconstruction means.

* * * * *